(12) United States Patent
Bilcu et al.

(10) Patent No.: US 8,520,967 B2
(45) Date of Patent: Aug. 27, 2013

(54) METHODS AND APPARATUSES FOR FACILITATING GENERATION IMAGES AND EDITING OF MULTIFRAME IMAGES

(75) Inventors: Radu Ciprian Bilcu, Tampere (FI); Sakari Alenius, Lempäälä (FI); Markku Vehvilainen, Tampere (FI); Antti Eronen, Tampere (FI)

(73) Assignee: Nokia Corporation, Espoo (FI)

( * ) Notice: Subject to any disclaimer, the term of this patent is extended or adjusted under 35 U.S.C. 154(b) by 963 days.

(21) Appl. No.: 12/492,839

(22) Filed: Jun. 26, 2009

(65) Prior Publication Data

US 2010/0331047 A1    Dec. 30, 2010

(51) Int. Cl.
*G06K 9/36* (2006.01)

(52) U.S. Cl.
USPC .................................... 382/254; 382/299

(58) Field of Classification Search
None
See application file for complete search history.

(56) References Cited

U.S. PATENT DOCUMENTS

| | | | |
|---|---|---|---|
| 5,696,848 A | 12/1997 | Patti et al. | |
| 2003/0108252 A1 | 6/2003 | Carrig | |
| 2005/0120307 A1 | 6/2005 | Suzuki | |
| 2006/0177150 A1* | 8/2006 | Uyttendaele et al. | 382/284 |
| 2007/0133901 A1 | 6/2007 | Aiso | |
| 2009/0143109 A1* | 6/2009 | Yamazaki | 455/566 |
| 2009/0189900 A1 | 7/2009 | Furukawa et al. | |

FOREIGN PATENT DOCUMENTS

WO    WO 2008/041522 A1    10/2008

OTHER PUBLICATIONS

E. Reinhard, et al.; "High Dynamic Range Imaging—Acquisition, Display and Image-Based Lightning," Morgan Kaufman Publisher.
S. Cheng, et al.; *Extended Depth-of-Field Microscope Imaging: MPP Image Fusino* VS. *Wavefront Coding*," IEEE, Jun. 2006.
International Search Report and Written Opinion on International Application No. PCT/FI2010/050491, mailed Dec. 1, 2010 (15 sheets).

* cited by examiner

*Primary Examiner* — Brian P Werner
(74) *Attorney, Agent, or Firm* — Alston & Bird LLP (57) ABSTRACT

Methods and apparatuses are provided for facilitating generation and editing of multiframe images. A method may include grouping a plurality of images into one or more groups of images. Each group of images may comprise a plurality of images depicting a common scene. The method may further include determining a reference image for at least one of the one or more groups of images. Each reference image may be associated with a respective group for which it was determined. The method may additionally include causing at least one reference image to be displayed to a user such that the user is enabled to select a displayed reference image to enhance using multiframe image processing to generate a multiframe image from a plurality of images from the group of images with which the selected displayed reference image is associated. Corresponding apparatuses are also provided.

20 Claims, 7 Drawing Sheets

METHODS AND APPARATUSES FOR FACILITATING GENERATION IMAGES AND EDITING OF MULTIFRAME IMAGES

TECHNOLOGICAL FIELD

Embodiments of the present invention relate generally to image visualization and editing technology and, more particularly, relate to methods and apparatuses for facilitating generation and editing of multiframe images.

BACKGROUND

The modern computing era has brought about a tremendous expansion in computing power as well as increased affordability of computing devices. Many computing devices available to consumers now have sufficient processing capabilities to perform advanced image processing techniques. One such advanced image processing technique is the generation of a multiframe image using multiple images of a common scene combined into a single multiframe output image. The multiframe output image may show more objects of the scene in focus and/or may show greater detail of the scene than any one single image from which the multiframe image was generated. Accordingly, multiframe image processing provides a useful image enhancement technique to consumers.

However, although algorithms have been developed for multiframe image processing and computing devices capable of performing multiframe image processing are now available to consumers at affordable prices, consumers may not be able to take advantage of multiframe image processing techniques for enhancing images due to a lack of a user interface for facilitating the generation and editing of multiframe images.

BRIEF SUMMARY OF SOME EXAMPLES OF THE INVENTION

Methods, apparatuses, and computer program products are therefore provided for facilitating generation and editing of multiframe images. In this regard, methods, apparatuses, and computer program products are provided that may provide several advantages to computing devices and computing device users. Embodiments of the invention provide an interface allowing users to generate a multiframe image. In this regard, embodiments of the invention provide for grouping of images depicting a common scene and determining a reference image for the group. Embodiments of the invention allow users to select a region of interest of the reference image and an enhancement to apply to the region of interest such that a multiframe image is generated by applying the selected enhancement to the region of interest using one or more images from the group in combination with the reference image. Some embodiments of the invention provide for an image gallery such that a reference image is displayed for each of a plurality of groups of images and a user is allowed to select one of the reference images for editing to generate a multiframe image.

In a first example embodiment, a method is provided, which comprises grouping a plurality of images into one or more groups of images, each group of images comprising a plurality of images depicting a common scene. The method of this embodiment further comprises determining a reference image for at least one of the one or more groups of images. Each reference image of this embodiment is associated with a respective group for which the reference image was determined. The method of this embodiment also comprises causing at least one reference image to be displayed to a user such that the user is enabled to select a displayed reference image to enhance using multiframe image processing to generate a multiframe image from a plurality of images from the group of images with which the selected displayed reference image is associated.

In another example embodiment, an apparatus is provided. The apparatus of this embodiment comprises at least one processor and at least one memory storing computer program code, wherein the at least one memory and stored computer program code are configured to, with the at least one processor, cause the apparatus to at least group a plurality of images into one or more groups of images, each group of images comprising a plurality of images depicting a common scene. The at least one memory and stored computer program code are configured to, with the at least one processor, further cause the apparatus of this embodiment to determine a reference image for at least one of the one or more groups of images. Each reference image of this embodiment is associated with a respective group for which the reference image was determined. The at least one memory and stored computer program code are configured to, with the at least one processor, additionally cause the apparatus of this embodiment to cause at least one reference image to be displayed to a user such that the user is enabled to select a displayed reference image to enhance using multiframe image processing to generate a multiframe image from a plurality of images from the group of images with which the selected displayed reference image is associated.

In another example embodiment, a computer program product is provided. The computer program product includes at least one computer-readable storage medium having computer-readable program instructions stored therein. The computer-readable program instructions may include a plurality of program instructions. Although in this summary, the program instructions are ordered, it will be appreciated that this summary is provided merely for purposes of example and the ordering is merely to facilitate summarizing the computer program product. The example ordering in no way limits the implementation of the associated computer program instructions. The first program instruction of this embodiment is configured for grouping a plurality of images into one or more groups of images, each group of images comprising a plurality of images depicting a common scene. The second program instruction of this embodiment is configured for determining a reference image for at least one of the one or more groups of images. Each reference image of this embodiment is associated with a respective group for which the reference image was determined. The third program instruction of this embodiment is configured for causing at least one reference image to be displayed to a user such that the user is enabled to select a displayed reference image to enhance using multiframe image processing to generate a multiframe image from a plurality of images from the group of images with which the selected displayed reference image is associated.

In another example embodiment, an apparatus is provided that comprises means for grouping a plurality of images into one or more groups of images, each group of images comprising a plurality of images depicting a common scene. The apparatus of this embodiment further comprises means for determining a reference image for at least one of the one or more groups of images. Each reference image of this embodiment is associated with a respective group for which the reference image was determined. The apparatus of this embodiment additionally comprises means for causing at least one reference image to be displayed to a user such that the user is enabled to select a displayed reference image to enhance using multiframe image processing to generate a multiframe image from a plurality of images from the group of images with which the selected displayed reference image is associated.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some of which will be further described below, in addition to those here summarized.

BRIEF DESCRIPTION OF THE DRAWING(S)

Having thus described embodiments of the invention in general terms, reference will now be made to the accompanying drawings, which are not necessarily drawn to scale, and wherein:

DETAILED DESCRIPTION

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

As used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

Figure 1:
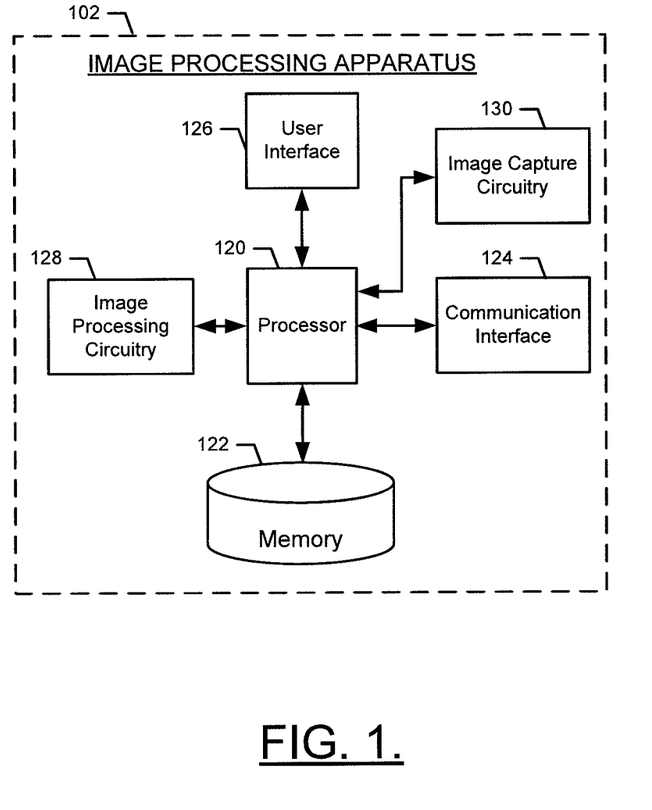
FIG. 1 illustrates an apparatus for facilitating generation and editing of multiframe images according to an exemplary embodiment of the present invention.

FIG. 1 illustrates an image processing apparatus 102 for facilitating generation and editing of multiframe images according to an exemplary embodiment of the present invention. As used herein, "exemplary" merely means an example and as such represents one example embodiment for the invention and should not be construed to narrow the scope or spirit of the invention in any way. It will be appreciated that the scope of the invention encompasses many potential embodiments in addition to those illustrated and described herein. As such, while FIG. 1 illustrates one example of a configuration of an image processing apparatus for facilitating generation and editing of multiframe images, numerous other configurations may also be used to implement embodiments of the present invention.

The image processing apparatus 102 may be embodied as a desktop computer, laptop computer, mobile terminal, mobile computer, mobile phone, mobile communication device, game device, digital camera/camcorder, audio/video player, television device, radio receiver, digital video recorder, positioning device, server, network node, multiple computing devices in communication with each other, any combination thereof, and/or the like. In an exemplary embodiment, the image processing apparatus 102 is embodied as a mobile terminal, such as that illustrated in FIG. 2.

Figure 2:
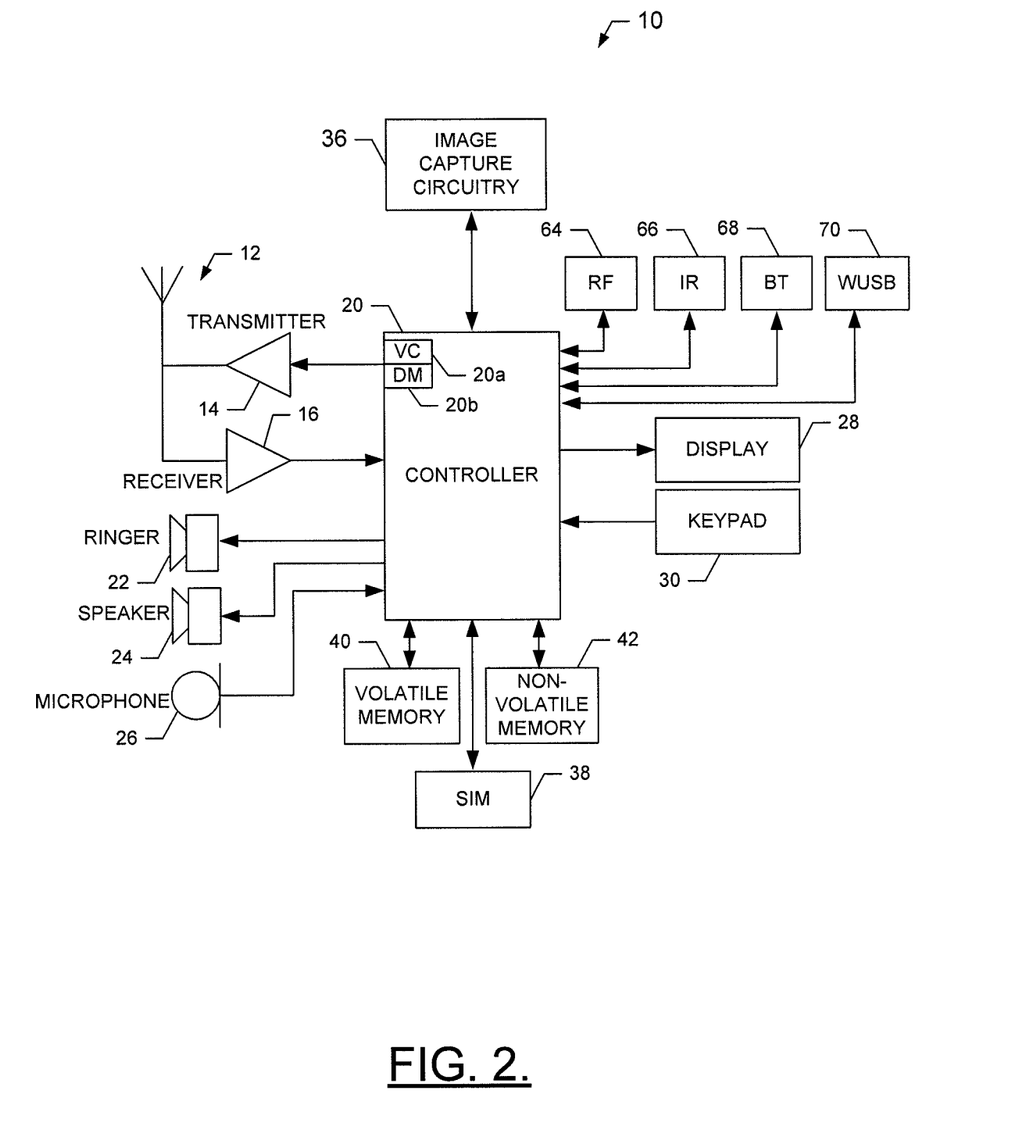
FIG. 2 is a schematic block diagram of a mobile terminal according to an exemplary embodiment of the present invention.

In this regard, FIG. 2 illustrates a block diagram of a mobile terminal 10 representative of one embodiment of an image processing apparatus 102 in accordance with embodiments of the present invention. It should be understood, however, that the mobile terminal 10 illustrated and hereinafter described is merely illustrative of one type of image processing apparatus 102 that may implement and/or benefit from embodiments of the present invention and, therefore, should not be taken to limit the scope of the present invention. While several embodiments of the electronic device are illustrated and will be hereinafter described for purposes of example, other types of electronic devices, such as mobile telephones, mobile computers, portable digital assistants (PDAs), pagers, laptop computers, desktop computers, gaming devices, televisions, and other types of electronic systems, may employ embodiments of the present invention.

As shown, the mobile terminal 10 may include an antenna 12 (or multiple antennas 12) in communication with a transmitter 14 and a receiver 16. The mobile terminal may also include a controller 20 or other processor(s) that provides signals to and receives signals from the transmitter and receiver, respectively. These signals may include signaling information in accordance with an air interface standard of an applicable cellular system, and/or any number of different wireline or wireless networking techniques, comprising but not limited to Wireless-Fidelity (Wi-Fi), wireless local access network (WLAN) techniques such as Institute of Electrical and Electronics Engineers (IEEE) 802.11, 802.16, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (e.g., session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

Some Narrow-band Advanced Mobile Phone System (NAMPS), as well as Total Access Communication System (TACS), mobile terminals may also benefit from embodiments of this invention, as should dual or higher mode phones (e.g., digital/analog or TDMA/CDMA/analog phones). Additionally, the mobile terminal 10 may be capable of operating according to Wireless Fidelity (Wi-Fi) or Worldwide Interoperability for Microwave Access (WiMAX) protocols.

It is understood that the controller 20 may comprise circuitry for implementing audio/video and logic functions of the mobile terminal 10. For example, the controller 20 may comprise a digital signal processor device, a microprocessor device, an analog-to-digital converter, a digital-to-analog converter, and/or the like. Control and signal processing functions of the mobile terminal may be allocated between these devices according to their respective capabilities. The controller may additionally comprise an internal voice coder (VC) 20a, an internal data modem (DM) 20b, and/or the like. Further, the controller may comprise functionality to operate one or more software programs, which may be stored in memory. For example, the controller 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), and/or the like. The mobile terminal 10 may be capable of using a Transmission Control Protocol/Internet Protocol (TCP/IP) to transmit and receive web content across the interne or other networks.

The mobile terminal 10 may also comprise a user interface including, for example, an earphone or speaker 24, a ringer 22, a microphone 26, a display 28, a user input interface, and/or the like, which may be operationally coupled to the controller 20. In this regard, the controller 20 may comprise user interface circuitry configured to control at least some functions of one or elements of the user interface, such as, for example, the speaker 24, the ringer 22, the microphone 26, the display 28, and/or the like. The controller 20 and/or user interface circuitry comprising the controller 20 may be configured to control one or more functions of one or more elements of the user interface through computer program instructions (e.g., software and/or firmware) stored on a memory accessible to the controller 20 (e.g., volatile memory 40, non-volatile memory 42, and/or the like). Although not shown, the mobile terminal may comprise a battery for powering various circuits related to the mobile terminal, for example, a circuit to provide mechanical vibration as a detectable output. The user input interface may comprise devices allowing the mobile terminal to receive data, such as a keypad 30, a touch display (not shown), a joystick (not shown), and/or other input device. In embodiments including a keypad, the keypad may comprise numeric (0-9) and related keys (#, *), and/or other keys for operating the mobile terminal.

As shown in FIG. 2, the mobile terminal 10 may also include one or more means for sharing and/or obtaining data. For example, the mobile terminal may comprise a short-range radio frequency (RF) transceiver and/or interrogator 64 so data may be shared with and/or obtained from electronic devices in accordance with RF techniques. The mobile terminal may comprise other short-range transceivers, such as, for example, an infrared (IR) transceiver 66, a Bluetooth™ (BT) transceiver 68 operating using Bluetooth™ brand wireless technology developed by the Bluetooth™ Special Interest Group, a wireless universal serial bus (USB) transceiver 70 and/or the like. The Bluetooth™ transceiver 68 may be capable of operating according to ultra-low power Bluetooth™ technology (e.g., Wibree™) radio standards. In this regard, the mobile terminal 10 and, in particular, the short-range transceiver may be capable of transmitting data to and/or receiving data from electronic devices within a proximity of the mobile terminal, such as within 10 meters, for example. Although not shown, the mobile terminal may be capable of transmitting and/or receiving data from electronic devices according to various wireless networking techniques, including Wireless Fidelity (Wi-Fi), WLAN techniques such as IEEE 802.11 techniques, IEEE 802.16 techniques, and/or the like.

In an exemplary embodiment, the mobile terminal 10 may include a media capturing element, such as a camera, video and/or audio module, in communication with the controller 20. The media capturing element may be any means for capturing an image, video and/or audio for storage, display or transmission. For example, in an exemplary embodiment in which the media capturing element comprises image capture circuitry 36, the image capture circuitry 36 may include a digital camera capable of forming a digital image file from a captured image. In addition, the digital camera of the image capture circuitry 36 may be capable of capturing a video clip. As such, the image capture circuitry 36 may include all hardware, such as a lens or other optical component(s), and software necessary for creating a digital image file from a captured image as well as a digital video file from a captured video clip. Alternatively, the image capture circuitry 36 may include only the hardware needed to view an image, while a memory device of the mobile terminal 10 stores instructions for execution by the controller 20 in the form of software necessary to create a digital image file from a captured image. As yet another alternative, an object or objects within a field of view of the image capture circuitry 36 may be displayed on the display 28 of the mobile terminal 10 to illustrate a view of an image currently displayed which may be captured if desired by the user. In an exemplary embodiment, the image capture circuitry 36 may further include a processing element such as a co-processor which assists the controller 20 in processing image data and an encoder and/or decoder for compressing and/or decompressing image data. The encoder and/or decoder may encode and/or decode according to, for example, a joint photographic experts group (JPEG) standard, a moving picture experts group (MPEG) standard, or other format.

The mobile terminal 10 may comprise memory, such as a subscriber identity module (SIM) 38, a removable user identity module (R-UIM), and/or the like, which may store information elements related to a mobile subscriber. In addition to the SIM, the mobile terminal may comprise other removable and/or fixed memory. The mobile terminal 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (e.g., hard disks, floppy disk drives, magnetic tape, etc.), optical disc drives and/or media, non-volatile random access memory (NVRAM), and/or the like. Like volatile memory 40 non-volatile memory 42 may include a cache area for temporary storage of data. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

Returning now to FIG. 1, in an exemplary embodiment the image processing apparatus 102 includes various means, such as a processor 120, memory 122, communication interface 124, user interface 126, image processing circuitry 128, and image capture circuitry 130 for performing the various functions herein described. These means of image processing apparatus 102 as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium (e.g. memory 122) that is executable by a suitably configured processing device (e.g., the processor 120), or some combination thereof.

The processor 120 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 1 as a single processor, in some embodiments the processor 120 comprises a plurality of processors. The plurality of processors may be embodied on a single computing device or may be distributed across a plurality of computing devices collectively configured to function as the image processing apparatus 102. The plurality of processors may be in operative communication with each other and may be collectively configured to perform one or more functionalities of the image processing apparatus 102 as described herein. In embodiments wherein the image processing apparatus 102 is embodied as a mobile terminal 10, the processor 120 may be embodied as or comprise the controller 20. In an exemplary embodiment, the processor 120 is configured to execute instructions stored in the memory 122 or otherwise accessible to the processor 120. These instructions, when executed by the processor 120, may cause the image processing apparatus 102 to perform one or more of the functionalities of the image processing apparatus 102 as described herein. As such, whether configured by hardware or software methods, or by a combination thereof, the processor 120 may comprise an entity capable of performing operations according to embodiments of the present invention while configured accordingly. Thus, for example, when the processor 120 is embodied as an ASIC, FPGA or the like, the processor 120 may comprise specifically configured hardware for conducting one or more operations described herein. Alternatively, as another example, when the processor 120 is embodied as an executor of instructions, such as may be stored in the memory 122, the instructions may specifically configure the processor 120 to perform one or more algorithms and operations described herein.

The memory 122 may include, for example, volatile and/or non-volatile memory. Although illustrated in FIG. 1 as a single memory, the memory 122 may comprise a plurality of memories. The plurality of memories may be embodied on a single computing device or distributed across a plurality of computing devices. The memory 122 may comprise volatile memory, non-volatile memory, or some combination thereof. In this regard, the memory 122 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. In embodiments wherein the image processing apparatus 102 is embodied as a mobile terminal 10, the memory 122 may comprise the volatile memory 40 and/or the non-volatile memory 42. The memory 122 may be configured to store information, data, applications, instructions, or the like for enabling the image processing apparatus 102 to carry out various functions in accordance with exemplary embodiments of the present invention. For example, in at least some embodiments, the memory 122 is configured to buffer input data for processing by the processor 120. Additionally or alternatively, in at least some embodiments, the memory 122 is configured to store program instructions for execution by the processor 120. The memory 122 may store information in the form of static and/or dynamic information. This stored information may be stored and/or used by the image processing circuitry 128 and/or image capture circuitry 130 during the course of performing their functionalities.

The communication interface 124 may be embodied as any device or means embodied in circuitry, hardware, a computer program product comprising computer readable program instructions stored on a computer readable medium (e.g., the memory 122) and executed by a processing device (e.g., the processor 120), or a combination thereof that is configured to receive and/or transmit data from/to another device, such as, for example, a server, a user device (e.g., the user device 304 illustrated in FIG. 3), an image source, and/or the like. In at least one embodiment, the communication interface 124 is at least partially embodied as or otherwise controlled by the processor 120. In this regard, the communication interface 124 may be in communication with the processor 120, such as via a bus. The communication interface 124 may include, for example, an antenna, a transmitter, a receiver, a transceiver and/or supporting hardware or software for enabling communications with another computing device. The communication interface 124 may be configured to receive and/or transmit data using any protocol that may be used for communications between computing devices. The communication interface 124 may additionally be in communication with the memory 122, user interface 126, image processing circuitry, and/or image capture circuitry 130, such as via a bus.

The user interface 126 may be in communication with the processor 120 to receive an indication of a user input and/or to provide an audible, visual, mechanical, or other output to a user. As such, the user interface 126 may include, for example, a keyboard, a mouse, a joystick, a display, a touch screen display, a microphone, a speaker, and/or other input/output mechanisms. In embodiments wherein the image processing apparatus 102 is embodied as a server, aspects of the user interface 126 may be reduced or the user interface 126 may even be eliminated. Alternatively, in embodiments wherein the image processing apparatus 102 is embodied as a server, at least some aspects of the user interface 126 may be embodied on an apparatus used by a user that is in communication with the image processing apparatus 102, such as for example, the user device 304 illustrated in FIG. 3. The user interface 126 may provide means for a user to browse through a gallery of images and/or make selections for generating a multiframe image. The user interface 126 may be in communication with the memory 122, communication interface 124, image processing circuitry 128, and/or image capture circuitry 130, such as via a bus.

The image processing circuitry 128 may be embodied as various means, such as circuitry, hardware, a computer program product comprising computer readable program instructions stored on a computer readable medium (e.g., the memory 122) and executed by a processing device (e.g., the processor 120), or some combination thereof and, in one embodiment, is embodied as or otherwise controlled by the processor 120. In embodiments wherein the image processing circuitry 128 is embodied separately from the processor 120, the image processing circuitry 128 may be in communication with the processor 120. The image processing circuitry 128 may further be in communication with one or more of the memory 122, communication interface 124, user interface 126, or image capture circuitry 130 such as via a bus.

The image capture circuitry 130 may comprise a camera, video and/or audio module, Additionally or alternatively, the image capture circuitry 130 may comprise circuitry, hardware, a computer program product comprising computer readable program instructions stored on a computer readable medium (e.g., the memory 122) and executed by a processing device (e.g., the processor 120), or some combination thereof for operating a camera, video, and/or audio module. In some embodiments, the image capture circuitry 130 operates under the direction of and/or is otherwise in communication with the processor 120. The image capture circuitry 130 may facilitate the capture of an image for storage, display or transmission. As such, the image capture circuitry 30 may include circuitry, hardware, such as a lens or other optical component(s), and/or program instructions to facilitate creation of a digital image file from a captured image. In embodiments wherein the image processing apparatus 102 is embodied as a mobile terminal 10, the image capture circuitry 130 may comprise the image capture circuitry 36. In some embodiments, such as when the image processing apparatus 102 is embodied as a server, the image processing apparatus may not comprise an image capture circuitry 130 and images processed by the image processing circuitry 128 may be captured and/or stored on another computing device, such as, for example, the user device 304 illustrated in FIG. 3. The image capture circuitry 130 may be in communication with one or more of the processor 120, memory 122, communication interface 124, user interface 126, or image processing circuitry 128, such as via a bus.

Figure 3:
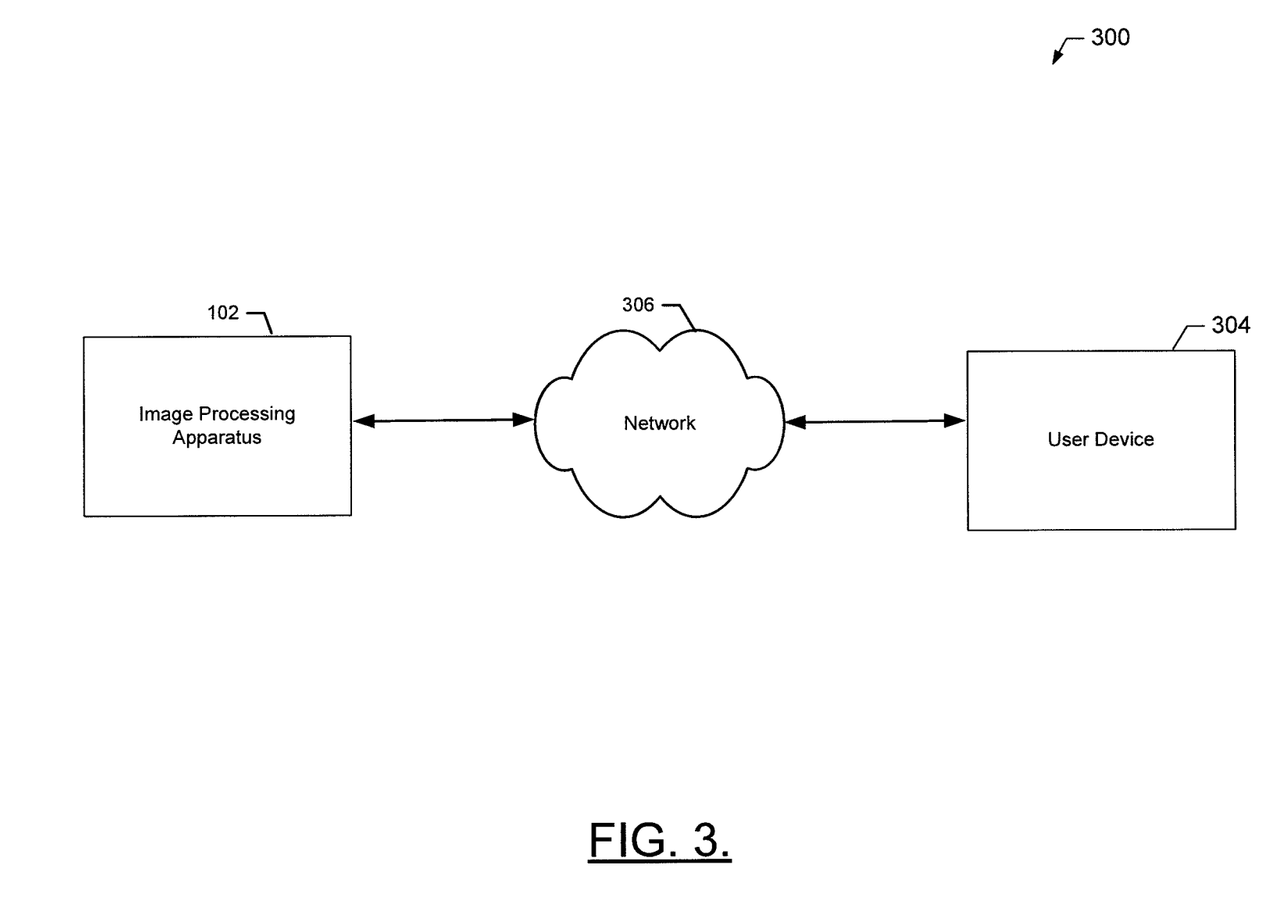
FIG. 3 illustrates a system for facilitating generation and editing of multiframe images according to an exemplary embodiment of the present invention.

FIG. 3 illustrates a system 300 for facilitating generation and editing of multiframe images according to an exemplary embodiment of the present invention. In this regard, FIG. 3 illustrates a system wherein the image processing apparatus 102 is embodied as one or more servers in communication with a remote user device 304 over a network 306. The network 306 may comprise a wireless network (e.g., a cellular network, wireless local area network, wireless personal area network, wireless metropolitan area network, and/or the like), a wireline network, or some combination thereof, and in some embodiments comprises the internet. The user device 304 may comprise any device configured for use by a user to access image processing services provided by the image processing apparatus 102 over the network 306. In this regard, the user device 304 may be embodied as a desktop computer, laptop computer, mobile terminal, mobile computer, mobile phone, mobile communication device, game device, digital camera/camcorder, audio/video player, television device, radio receiver, digital video recorder, positioning device, any combination thereof, and/or the like. In one embodiment, the user device 304 is embodied as a mobile terminal 10.

In embodiments, such as that depicted in FIG. 3, wherein a user device 304 is remote from the image processing apparatus 102, elements of the image processing apparatus 102 that were described with respect to FIG. 1 and functionality attributed thereto may be distributed between the image processing apparatus 102 and user device 304. For example, the image processing circuitry 128 may be distributed between the image processing apparatus 102 and user device 304, such that functionality attributed to the image processing circuitry 128 may be performed by the image processing apparatus 102 and/or by the user device 304. Additionally or alternatively, where the image processing circuitry 128 is said to be configured to cause a user interface, one or more images, and/or other data to be displayed, it will be appreciated that the image processing circuitry 128 may be configured to cause the user interface, one or more images, and/or other data to be displayed on a display connected to the image processing apparatus 102 and/or may be configured to cause transmission of the data to be displayed via the communication interface 124 to a user device 304 such that the user interface, one or more images, and/or other data may be displayed on a display connected to the user device 302. Similarly, where a user is described to make a selection of an image, a region of interest, an enhancement, provide some input, and/or the like, it will be appreciated that the user may be providing the selection or input via the user interface 126 and/or may be interacting with the user device 304 such that the input and/or selection is transmitted from the user device 304 to the image processing apparatus 102, where it may be received by the communication interface 124 and/or image processing circuitry 128. Further, program instructions, images and/or other data said to be stored in the memory 122 may be stored at the image processing apparatus 102 and/or may be stored on the user device 302.

The image capture circuitry 130 may be configured to capture a plurality of images of a common scene. The plurality of images may each be captured manually by a user and the user may vary the capture settings with which the images are captured. Additionally or alternatively, the image capture circuitry 130 may be configured to capture a plurality of images automatically when a user takes a picture. In this regard, the image capture circuitry 130 may be configured to automatically determine distances to various objects in the scene depicted in the viewing frame of the image capture circuitry 130 and capture a sequence of images, each focused at one of the determined distances. The image capture circuitry 130 may then be configured to save the images, such as to the memory 122. Accordingly, a plurality of pictures of a common scene may be captured by the image capture circuitry 130 using settings automatically determined by the image capture circuitry 130 and/or manually configured by a user. Images depicting a "common scene" may depict a substantially similar scene, but may be captured using different settings. In this regard, images depicting a "common scene" may not necessarily depict the exact same area, but may at least depict substantially overlapping areas such that multiple images may be combined using multiframe image processing to generate an enhanced multiframe image.

In embodiments wherein the image processing apparatus 102 does not comprise an image capture circuitry 130 and/or in embodiments wherein images processed by the image processing circuitry 128 may be captured by another device, it will be appreciated that images may be transferred to the image processing apparatus 102 and stored at least temporarily in the memory 122 and/or may be accessed by the image processing circuitry 128 from a remote device, such as a user device 304. These images captured by another device may be captured similarly as described above in connection with the image capture circuitry 130.

The image processing circuitry 128 is configured in some embodiments to access a plurality of images, such as may be stored in memory 122 and/or to access a plurality of images stored in a remote device, such as the user device 304 and group the plurality of images into one or more groups of images. Each group of images may comprise a plurality of images depicting a common scene. In some embodiments, the plurality of images may be captured by different users and/or with several different devices (e.g., with a plurality of user devices 304). Groups may thus be formed from a plurality of images depicting a common scene captured by different users, with different devices, and/or at different times. The image processing circuitry 128 may be configured to perform the grouping automatically and/or with the assistance of user input. The image processing circuitry 128 may be configured to visually analyze images to group images depicting a common scene. Additionally or alternatively, the image processing circuitry 128 may be configured to utilize data associated with one or more images, such as metadata, defining position information (e.g., Global Positioning System coordinates) defining a location at which one or more images were captured, date information defining a date on which an image was captured, time information defining a time at which one or more images were captured, information defining an order in which two or more images were captured, and/or other information associated with one or more images or that may be obtained through analysis of one or more images to group images depicting a common scene. In some embodiments, the image processing circuitry 128 may be configured to group images when the images are captured. For example, in embodiments wherein the image capture circuitry 130 is configured to automatically capture a plurality of images at various settings when a user triggers capture of an image, the plurality of images may be automatically grouped by the image processing circuitry 128.

In embodiments wherein a user may assist grouping of images, the image processing circuitry 128 may be configured to cause automatically determined groups to be displayed for user verification and/or to prompt a user to select a group for an image(s) that the image processing circuitry 128 was not able to group. Additionally or alternatively, the image processing circuitry 128 may be configured to group images based at least in part upon a user's manual selection of a group for one or more images.

After the image processing circuitry 128 has grouped images, the image processing circuitry 128 may be further configured to mark one or more grouped images to denote a group into which the grouped image(s) was grouped. In this regard, the image processing circuitry 128 may be configured to save images belonging to a common group to a common group folder, such as in the memory 122. Additionally or alternatively, the image processing circuitry 128 may be configured to associate a group tag, such as, for example, a metatag, with a grouped image to identify the group in which the image was grouped. The image processing circuitry 128 may be configured to modify a file name of a grouped image to reflect the group in which the grouped image was grouped, such as by appending a group name to the file name. The image processing circuitry 128 may mark grouped images by saving images grouped in a common group to a single group file, such as, for example, a ZIP file.

The image processing circuitry 128 is configured in some embodiments to determine a single reference image for a group. The reference image may be determined from among the images of the group and the reference image may be associated with the respective group for which the reference image was determined. The image processing circuitry 128 may be configured to determine a reference image for a group through visual analysis of the images of the group to determine the image having the best visual quality of the images in the group, by determining user selection of a reference image for the group, through predefined criteria (e.g., default criteria and/or user defined criteria, such as, for example, first image captured in the group), and/or the like.

Figure 4:
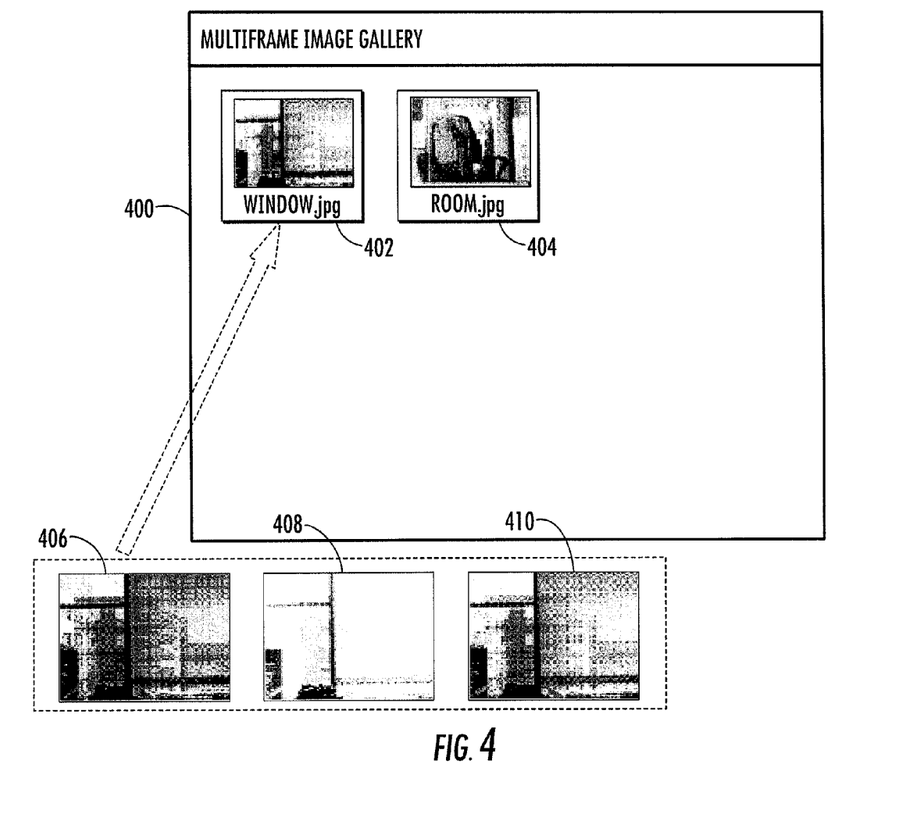
FIG. 4 illustrates a multiframe image gallery interface according to an exemplary embodiment of the invention.

In some embodiments, the image processing circuitry 128 is configured to cause one or more reference images representative of the respective groups with which they are associated to be displayed to a user. This display of a reference image(s) may provide a user interface enabling the user to select a displayed reference image to enhance using multiframe image processing applied by the image processing circuitry 128. For example, the image processing circuitry 128 may be configured to cause the one or more reference images to be displayed in an interactive image gallery, such as that illustrated in FIG. 4. In this regard, FIG. 4 illustrates a multiframe image gallery viewing window 400 that may be displayed to a user. The viewing window 400 depicts two reference images—"window.jpg" 402 and "room.jpg" 404, each of which is associated with a group comprising a plurality of images depicting a common scene. For example, images 406, 408, and 410 of the group with which "window.jpg" 402 is associated and which depict various captures of the same window are illustrated in the lower portion of FIG. 4. In an exemplary embodiment, the images 406, 408, and 410 are not visible to the user within the multiframe image gallery viewing window 400 and are illustrated in FIG. 4 merely to illustrate how a representative reference image for a given group of images depicting a common scene may be displayed.

Figure 5:
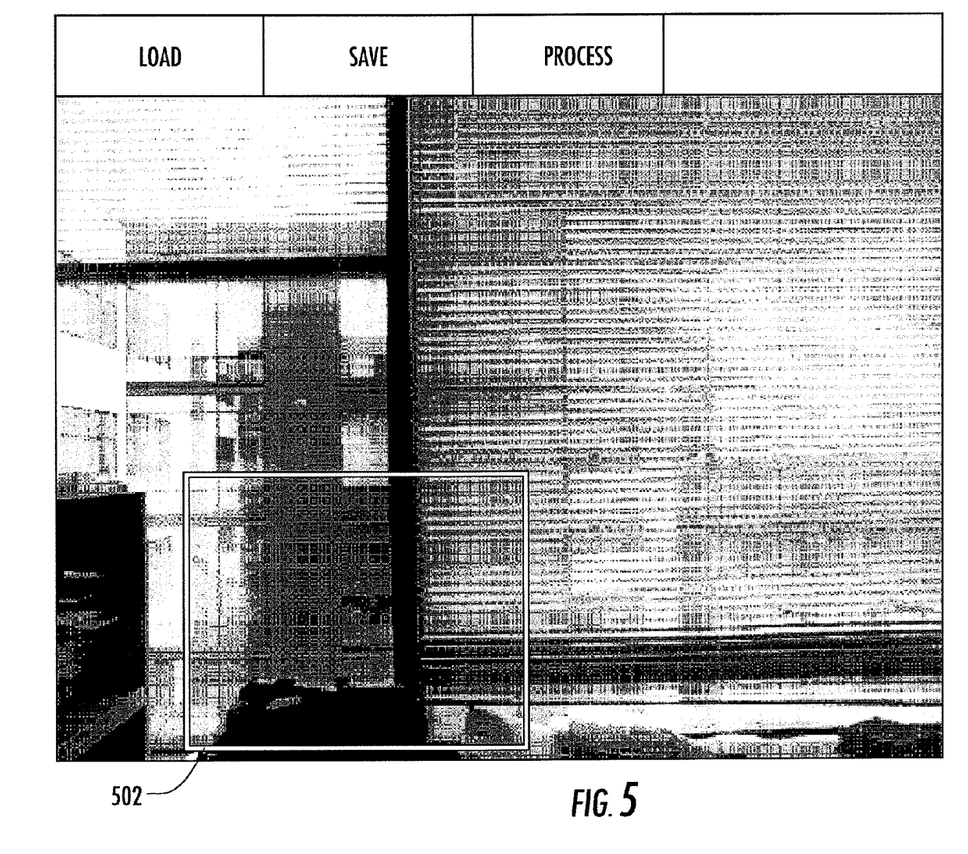
FIG. 5 illustrates an interface for defining a region of interest and selecting an enhancement according to an exemplary embodiment of the invention.

A user viewing one or more displayed reference images may select a reference image, such as through tactile selection on a touch screen display, keying an input key, selecting a reference image with a cursor, and/or other input selection means. The image processing circuitry 128 may be configured to determine this selection of a displayed reference image. In embodiments, such as that illustrated in FIG. 4 wherein multiple reference images are depicted in a gallery and the user selects one of the reference images, the image processing circuitry 128 may be configured to cause only the selected reference image to be illustrated, such as shown in FIG. 5 wherein the user has selected the "window.jpg" 402.

The user may further select at least a portion of a displayed reference image. The selection of a reference image itself may comprise the selection of at least a portion (e.g., selection of the entire reference image). Additionally or alternatively, a user may select at least a portion of a displayed reference image by defining boundaries of the selected portion, such as by sizing a box 502 illustrated in FIG. 5 to select at least a portion of the displayed reference image. Although the box 502 comprises a rectangle, it will be appreciated that selection of at least a portion of a displayed reference image may be defined using any shape or selection means, such as free form drawing, a circle, selection of a plurality of points defining a selected portion, any polygon shape, and/or the like. In another example, a selection of at least a portion of the displayed reference image may be defined using a single point, such as may be defined by a user by, for example, selecting a point on the displayed image with a touch screen display, selecting a point on the displayed image with a cursor, and/or the like. The image processing circuitry 128 is configured in some embodiments to determine the selection of the at least a portion of a displayed reference image. The selected at least a portion defines a region of interest (ROI) of the reference image. In some embodiments, the user is enabled to select more than one portion of a displayed reference image and so the image processing circuitry 128 may be configured to determine the selection of multiple selected portions of the displayed reference image, which define multiple ROIs.

The user may additionally select an enhancement(s) to apply to the ROI(s). The enhancement may, for example, comprise sharpening the focus of the ROI(s). The image processing circuitry 128 may be configured to determine such a selection of an enhancement. Additionally or alternatively, the image processing circuitry 128 may be configured to analyze the ROI(s) to automatically select an enhancement(s) to apply to the ROI(s) to enhance the visual quality of the ROI(s). In embodiments wherein multiple ROIs have been defined, the user may select a different enhancement(s) to apply to each ROI and/or the image processing circuitry 128 may be configured to analyze each ROI independent of the other ROI(s) to automatically select an enhancement(s) to apply to each respective ROI.

The image processing circuitry 128 is configured in some embodiments to determine, based at least in part on the ROI(s) and/or on the selected enhancement(s), one or more images from the group of images with which the reference image is associated to use in combination with the reference image for generation of a multiframe image having enhanced visual qualities compared to the reference image. The image processing circuitry 128 may further be configured to determine a multiframe image processing technique(s) to apply to the ROI(s) based at least in part on the selected enhancement (s) and/or on the determined one or more images to use in combination with the reference image. In this regard, wherein multiple ROIs have been defined, the image processing circuitry may determine a multiframe image processing technique to apply to each ROI based at least in part upon the selected enhancement(s) for each respective ROI and/or on the determined one or more images to use in combination with the reference image. The determined multiframe image processing technique(s) may comprise, for example, a multiframe high dynamic range (HDR) technique, such as may be used to enhance visibility of the ROI. In another example, the determined multiframe image processing technique(s) may comprise an extended-depth-of-focus (also referred to as extended-depth-of-field) (EDOF) technique, such as may be used to enhance the sharpening of an object displayed in the ROI by combining one or more determined images captured at different focus settings with the reference image (e.g., to generate an "all-in-focus image"). It will be appreciated that HDR and EDOF techniques are merely provided as examples of multiframe image processing techniques that the image processing circuitry 128 may be configured to determine to use for generation of a multiframe image and other multiframe image processing techniques may be determined and used in addition to or in lieu of these techniques.

The image processing circuitry 128 may then be configured to generate a multiframe image using the determined one or more images in combination with the reference image to generate the resulting multiframe image. The image processing circuitry 128 may use the determined multiframe image processing technique(s) to generate the multiframe image. Once the multiframe image has been generated, the image processing circuitry 128 may be configured to cause the multiframe image to be displayed to the user and/or may save the multiframe image to the memory 122.

Figure 6:
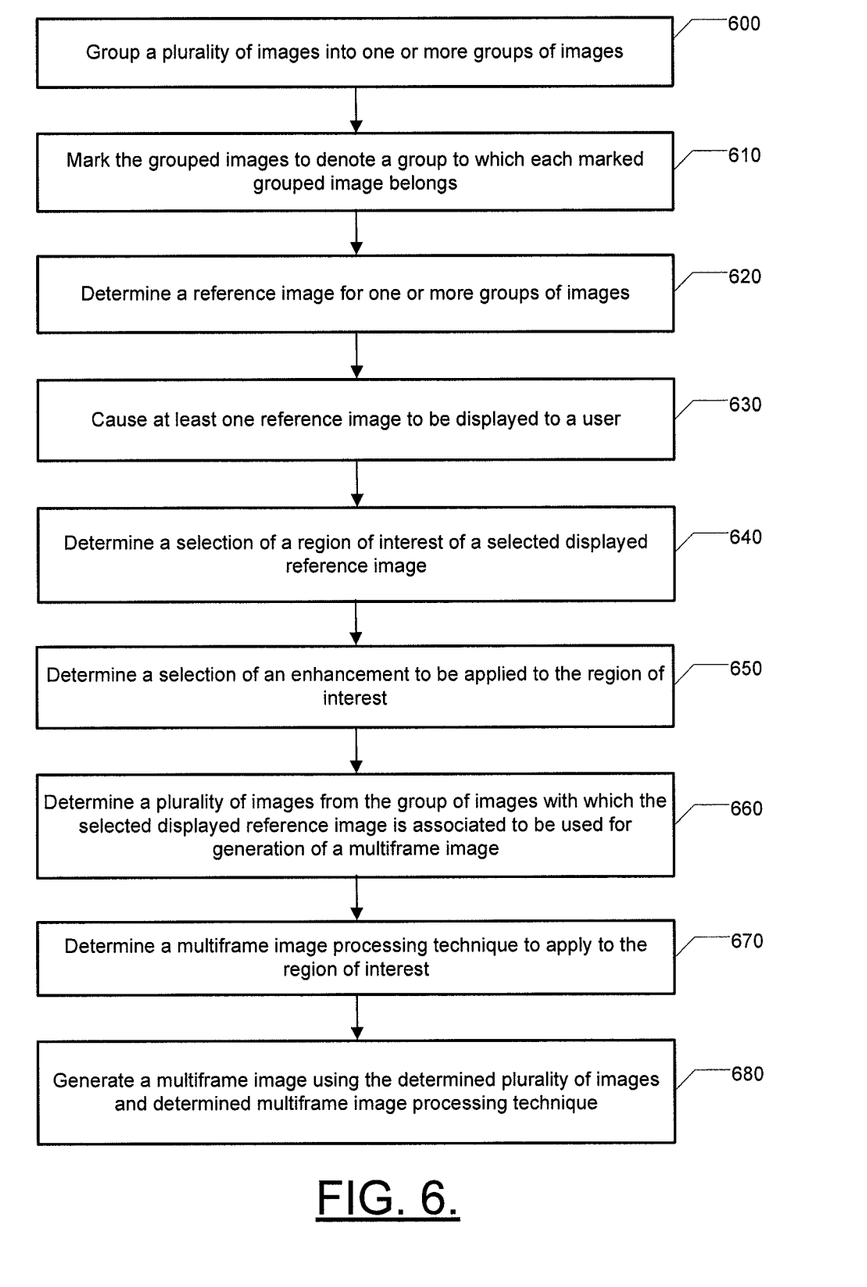
FIG. 6 illustrates a flowchart according to an exemplary method for facilitating generation and editing of multiframe images according to an exemplary embodiment of the invention.

FIG. 6 illustrates a flowchart according to an exemplary method for facilitating generation and editing of multiframe images according to an exemplary embodiment of the invention. In this regard, FIG. 6 illustrates operations that may be performed by the image processing circuitry 128. The method may include the image processing circuitry 128 grouping a plurality of images into one or more groups comprising images depicting a common scene, at operation 600. Operation 610 may comprise the image processing circuitry 128 marking the grouped images to denote a group to which each marked grouped image belongs. The image processing circuitry 128 may then determine a reference image for one or more groups of images, at operation 620. Operation 630 may comprise the image processing circuitry 128 causing at least one reference image to be displayed to a user. The image processing circuitry 128 may then determine a selection of a displayed reference image and/or a selection of a region of interest thereof, at operation 640. Operation 650 may comprise the image processing circuitry 128 determining a selection of an enhancement to be applied to the region of interest. The image processing circuitry 128 may then determine a plurality of images from the group of images with which the selected displayed reference image is associated to be used for generation of a multiframe image, at operation 660. Operation 670 may comprise the image processing circuitry 128 determining a multiframe image processing technique to apply to the region of interest. The image processing circuitry 128 may then generate a multiframe image using the determined plurality of images and determined multiframe image processing technique, at operation 680.

Figure 7:
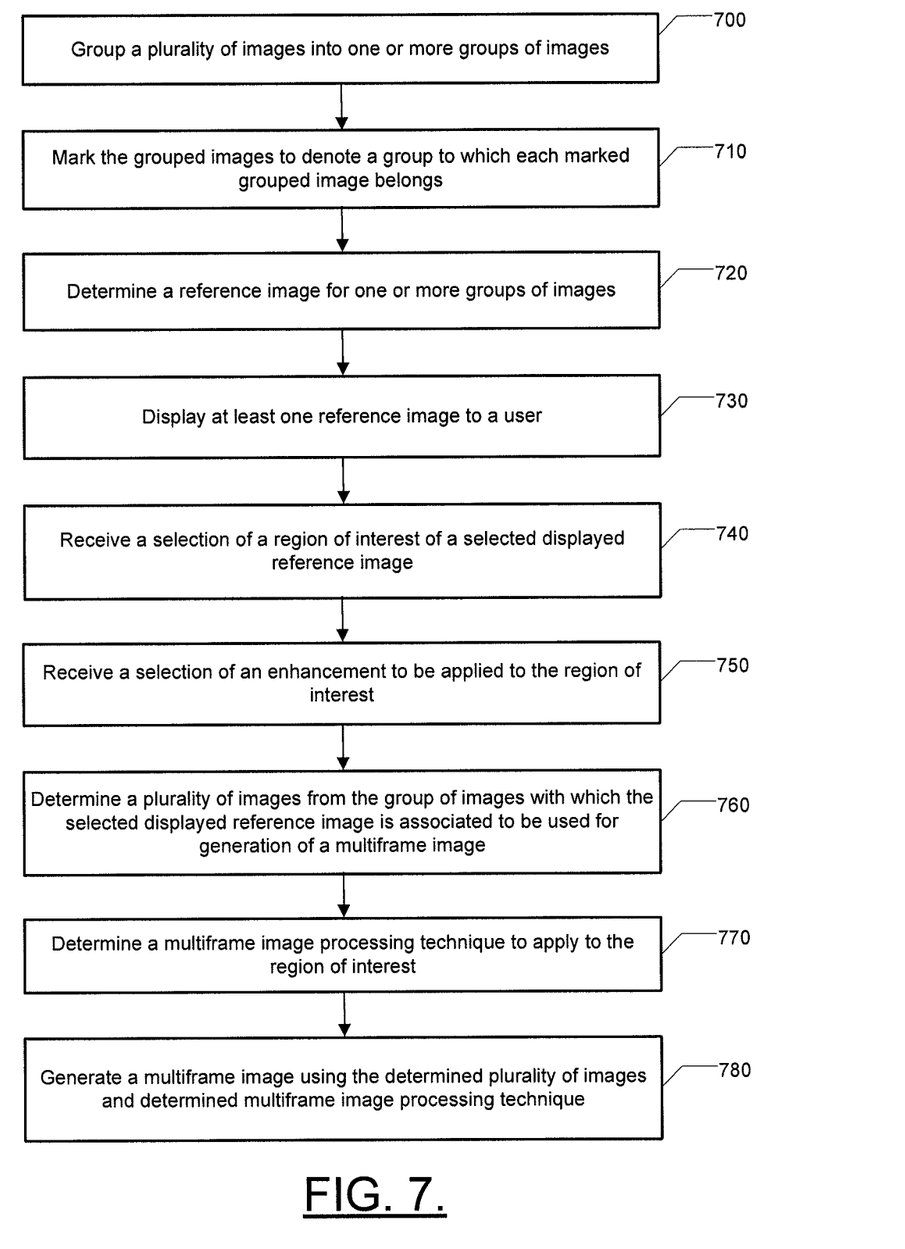
FIG. 7 illustrates a flowchart according to an exemplary method for facilitating generation and editing of multiframe images according to an exemplary embodiment of the invention.

FIG. 7 illustrates a flowchart according to an exemplary method for facilitating generation and editing of multiframe images according to an exemplary embodiment of the invention. In this regard, FIG. 7 illustrates operations that may be performed by the image processing apparatus 102, user device 304, or a combination thereof. The method may include grouping a plurality of images into one or more groups comprising images depicting a common scene, at operation 700. Operation 710 may comprise marking the grouped images to denote a group to which each marked grouped image belongs. Operation 720 may comprise determining a reference image for one or more groups of images. Operation 730 may comprise displaying at least one reference image to a user. Operation 740 may comprise receiving a user selection of a displayed reference image and/or a selection of a region of interest thereof. Operation 750 may comprise receiving a selection of an enhancement to be applied to the region of interest. Operation 760 may comprise determining a plurality of images from the group of images with which the selected displayed reference image is associated to be used for generation of a multiframe image. Operation 770 may comprise determining a multiframe image processing technique to apply to the region of interest. Operation 780 may comprise generating a multiframe image using the determined plurality of images and determined multiframe image processing technique.

FIGS. 6-7 are flowcharts of a system, method, and computer program product according to exemplary embodiments of the invention. It will be understood that each block or step of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by one or more memory devices of a mobile terminal, server, or other computing device (e.g., the image processing apparatus 102, user device 304, combination thereof, and/or the like) and executed by a processor (e.g., the processor 120) in the computing device. In some embodiments, the computer program instructions comprising the computer program product (s) which embody the procedures described above may be stored by memory devices of a plurality of computing devices. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s) or step(s). Further, the computer program product may comprise one or more computer-readable memories on which the computer program instructions may be stored such that the one or more computer-readable memories can direct a computer or other programmable apparatus to function in a particular manner, such that the computer program product comprises an article of manufacture which implements the function specified in the flowchart block(s) or step(s). The computer program instructions of one or more computer program products may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart block(s) or step(s).

Accordingly, blocks or steps of the flowchart support combinations of means for performing the specified functions and combinations of steps for performing the specified functions. It will also be understood that one or more blocks or steps of the flowchart, and combinations of blocks or steps in the flowchart, may be implemented by special purpose hardware-based computer systems which perform the specified functions or steps, or combinations of special purpose hardware and computer program product(s).

The above described functions may be carried out in many ways. For example, any suitable means for carrying out each of the functions described above may be employed to carry out embodiments of the invention. In one embodiment, a suitably configured processor may provide all or a portion of the elements of the invention. In another embodiment, all or a portion of the elements of the invention may be configured by and operate under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

As such, then, some embodiments of the invention provide several advantages to computing devices and computing device users. Embodiments of the invention provide an interface allowing users to generate a multiframe image. In this regard, embodiments of the invention provide for grouping of images depicting a common scene and determining a reference image for the group. Embodiments of the invention allow users to select a region of interest of the reference image and an enhancement to apply to the region of interest such that a multiframe image is generated by applying the selected enhancement to the region of interest using one or more images from the group in combination with the reference image. Some embodiments of the invention provide for an image gallery such that a reference image is displayed for each of a plurality of groups of images and a user is allowed to select one of the reference images for editing to generate a multiframe image.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/ or functions than those explicitly described above are also contemplated as may be set forth in some of the appended claims. Although specific terms are employed herein, they are used in a generic and descriptive sense only and not for purposes of limitation.

What is claimed is:

1. A method comprising:
grouping a plurality of images into one or more groups of images, each group of images comprising a plurality of images depicting a common scene;
identifying at least one unassigned image that cannot be automatically assigned to the one or more groups of images;
receiving an indicator via an interface to assign the at least one unassigned image to the one or more groups of images;
in response to receiving the indicator, assigning the at least one unassigned image to at least one of the one or more groups of images;
determining a reference image for the at least one of the one or more groups of images, each reference image associated with a respective group for which it was determined; and
causing at least one reference image to be displayed to a user such that the user is enabled to select a displayed reference image to enhance using multiframe image processing applied by image processing circuitry to generate a multiframe image from a plurality of images from the group of images with which the selected displayed reference image is associated.

2. The method of claim 1, further comprising:
determining a selection of a displayed reference image and selection of at least a portion of the selected displayed reference image, the at least a portion of the selected displayed reference image defining a region of interest;
determining, based at least in part upon the region of interest, a plurality of images from the group of images with which the selected displayed reference image is associated to use for generation of a multiframe image; and
generating a multiframe image from the determined plurality of images.

3. The method of claim 2, further comprising:
determining a selection of an enhancement to be applied to the region of interest; and
determining a multiframe image processing technique to apply to the region of interest based at least in part upon the selected enhancement; and
wherein generating a multiframe image comprises the image processing circuitry generating a multiframe image from the determined plurality of images using the determined multiframe image processing technique.

4. The method of claim 1, further comprising marking each grouped image to denote a group into which the grouped image was grouped by one or more of saving images belonging to a common group to a common group folder, associating a group tag with the grouped image, changing a file name of the grouped image to reflect the group in which the grouped image was grouped, or saving images belonging to a common group to a single group file.

5. The method of claim 1, wherein determining a reference image for at least one of the one or more groups of images comprises one or more of determining a user selection of a reference image for one or more groups of images, determining a reference image for one or more groups of images based at least in part upon predefined criteria, or determining an image having the best visual quality of the images in a respective group for one or more groups of images.

6. The method of claim 1, wherein grouping the plurality of images comprises grouping the plurality the images into one or more groups based at least in part upon one or more of visual analysis of the plurality of images to determine images depicting a common scene, user input, position information associated with one or more of the plurality of images, time information associated with one or more of the plurality of images, date information associated with one or more of the plurality of images, an order in which one or more of the plurality of images were captured, or automatic grouping of one or more of the plurality of images when one or more of the plurality of images is captured.

7. The method of claim 1, wherein causing at least one reference image to be displayed to a user comprises causing the at least one reference image to be displayed to the user in an image gallery; and
further comprising causing only a selected reference image to be displayed when the user selects one of the at least one displayed reference images to enable the user to select at least a portion of the selected image, the at least a portion of the selected displayed reference image defining a region of interest that the user wants to enhance.

8. An apparatus comprising at least one processor and at least one memory storing computer program code, wherein the at least one memory and stored computer program code are configured to, with the at least one processor, cause the apparatus to at least:
group a plurality of images into one or more groups of images, each group of images comprising a plurality of images depicting a common scene;
identify at least one unassigned image that cannot be automatically assigned to the one or more groups of images;
receive an indicator via an interface to assign the at least one unassigned image to the one or more groups of images;
in response to receiving the indicator, assign the at least one unassigned image to at least one of the one or more groups of images;
determine a reference image for the at least one of the one or more groups of images, each reference image associated with a respective group for which it was determined; and
cause at least one reference image to be displayed to a user such that the user is enabled to select a displayed reference image to enhance using multiframe image processing to generate a multiframe image from a plurality of images from the group of images with which the selected displayed reference image is associated.

9. The apparatus of claim 8, wherein the at least one memory and stored computer program code are configured to, with the at least one processor, further cause the apparatus to:
determine a selection of a displayed reference image and selection of at least a portion of the selected displayed reference image, the at least a portion of the selected displayed reference image defining a region of interest;
determine, based at least in part upon the region of interest, a plurality of images from the group of images with which the selected displayed reference image is associated to use for generation of a multiframe image; and
generate a multiframe image from the determined plurality of images.

10. The apparatus of claim 9, wherein the at least one memory and stored computer program code are configured to, with the at least one processor, further cause the apparatus to:
determine a selection of an enhancement to be applied to the region of interest; and
determine a multiframe image processing technique to apply to the region of interest based at least in part upon the selected enhancement; and
wherein the at least one memory and stored computer program code are configured to, with the at least one processor, cause the apparatus to generate a multiframe image by generating a multiframe image from the determined plurality of images using the determined multiframe image processing technique.

11. The apparatus of claim 8, wherein the at least one memory and stored computer program code are configured to, with the at least one processor, further cause the apparatus to mark each grouped image to denote a group into which the grouped image was grouped by one or more of saving images belonging to a common group to a common group folder, associating a group tag with the grouped image, changing a file name of the grouped image to reflect the group in which the grouped image was grouped, or saving images belonging to a common group to a single group file.

12. The apparatus of claim 8, wherein the at least one memory and stored computer program code are configured to, with the at least one processor, cause the apparatus to determine a reference image for at least one of the one or more groups of images by one or more of determining a user selection of a reference image for one or more groups of images, determining a reference image for one or more groups of images based at least in part upon predefined criteria, or determining an image having the best visual quality of the images in a respective group for one or more groups of images.

13. The apparatus of claim 8, wherein the at least one memory and stored computer program code are configured to, with the at least one processor, cause the apparatus to group the plurality of images by grouping the plurality the images into one or more groups based at least in part upon one or more of visual analysis of the plurality of images to determine images depicting a common scene, user input, position information associated with one or more of the plurality of images, time information associated with one or more of the plurality of images, date information associated with one or more of the plurality of images, an order in which one or more of the plurality of images were captured, or automatic grouping of one or more of the plurality of images when one or more of the plurality of images is captured.

14. The apparatus of claim 8, wherein the at least one memory and stored computer program code are configured to, with the at least one processor, cause the apparatus to cause at least one reference image to be displayed to a user by causing the at least one reference image to be displayed to the user in an image gallery; and
    wherein the at least one memory and stored computer program code are configured to, with the at least one processor, further cause the apparatus to cause only a selected reference image to be displayed when the user selects one of the at least one displayed reference images to enable the user to select at least a portion of the selected image, the at least a portion of the selected displayed reference image defining a region of interest that the user wants to enhance.

15. The apparatus of claim 8, wherein the apparatus comprises or is embodied on a mobile phone, the mobile phone comprising user interface circuitry and user interface software stored on one or more of the at least one memory; wherein the user interface circuitry and user interface software are configured to:
    facilitate user control of at least some functions of the mobile phone through use of a display; and
    cause at least a portion of the interface to be displayed on the display to facilitate user control of at least some functions of the mobile phone.

16. A computer program product comprising at least one computer-readable storage medium having computer-readable program instructions stored therein, the computer-readable program instructions comprising:
    a program instruction configured for grouping a plurality of images into one or more groups of images, each group of images comprising a plurality of images depicting a common scene;
    a program instruction configured for identifying at least one unassigned image that cannot be automatically assigned to the one or more groups of images;
    a program instruction configured for receiving an indicator via an interface to assign the at least one unassigned image to the one or more groups of images;
    a program instruction configured for in response to receiving the indicator, assigning the at least one unassigned image to at least one of the one or more groups of images;
    a program instruction configured for determining a reference image for the at least one of the one or more groups of images, each reference image associated with a respective group for which it was determined; and
    a program instruction configured for causing at least one reference image to be displayed to a user such that the user is enabled to select a displayed reference image to enhance using multiframe image processing to generate a multiframe image from a plurality of images from the group of images with which the selected displayed reference image is associated.

17. The computer program product of claim 16, further comprising:
    a program instruction configured for determining a selection of a displayed reference image and selection of at least a portion of the selected displayed reference image, the at least a portion of the selected displayed reference image defining a region of interest;
    a program instruction configured for determining, based at least in part upon the region of interest, a plurality of images from the group of images with which the selected displayed reference image is associated to use for generation of a multiframe image; and
    a program instruction configured for generating a multiframe image from the determined plurality of images.

18. The computer program product of claim 17, further comprising:
    a program instruction configured for determining a selection of an enhancement to be applied to the region of interest; and
    a program instruction configured for determining a multiframe image processing technique to apply to the region of interest based at least in part upon the selected enhancement; and
    wherein the program instruction configured for generating a multiframe image comprises instructions configured for generating a multiframe image from the determined plurality of images using the determined multiframe image processing technique.

19. The computer program product of claim 16, wherein the program instruction configured for determining a reference image for at least one of the one or more groups of images comprises instructions configured for one or more of determining a user selection of a reference image for one or more groups of images, determining a reference image for one or more groups of images based at least in part upon predefined criteria, or determining an image having the best visual quality of the images in a respective group for one or more groups of images.

20. The computer program product of claim 16, wherein the program instruction configured for grouping the plurality of images comprises instructions configured for grouping the plurality the images into one or more groups based at least in part upon one or more of visual analysis of the plurality of images to determine images depicting a common scene, user input, position information associated with one or more of the plurality of images, time information associated with one or more of the plurality of images, date information associated with one or more of the plurality of images, an order in which one or more of the plurality of images were captured, or automatic grouping of one or more of the plurality of images when one or more of the plurality of images is captured.

* * * * *

UNITED STATES PATENT AND TRADEMARK OFFICE
CERTIFICATE OF CORRECTION

PATENT NO. : 8,520,967 B2  
APPLICATION NO. : 12/492839  
DATED : August 27, 2013  
INVENTOR(S) : Bilcu et al.

Page 1 of 1

It is certified that error appears in the above-identified patent and that said Letters Patent is hereby corrected as shown below:

Title page, Item (54) and in the Specification, Column 1, Lines 1 through 3, title,
"Methods And Apparatuses For Facilitating Generation Images And Editing Of Multiframe Images" should read --Methods And Apparatuses For Facilitating Generation And Editing Of Multiframe Images--.

Signed and Sealed this  
Thirty-first Day of December, 2013

Margaret A. Focarino  
*Commissioner for Patents of the United States Patent and Trademark Office*